United States Patent [19]
Flint et al.

[11] 3,854,752
[45] Dec. 17, 1974

[54] VEHICLE STEP MOUNTING ARRANGEMENT

[75] Inventors: Walker H. Flint, Peoria; Gerald R. Haedicke, East Peoria, both of Ill.

[73] Assignee: Caterpillar Tractor Co., Peoria, Ill.

[22] Filed: Aug. 23, 1973

[21] Appl. No.: 390,878

[52] U.S. Cl. .............................. 280/166, 280/291
[51] Int. Cl. ............................................. B60r 3/02
[58] Field of Search ........... 280/163, 164 R, 164 A, 280/166, 291; 182/91; 105/443

[56] References Cited
UNITED STATES PATENTS
| | | | |
|---|---|---|---|
| 865,375 | 9/1907 | Frye | 182/91 |
| 1,521,180 | 12/1924 | Heberling | 280/166 |

Primary Examiner—M. Henson Wood, Jr.
Assistant Examiner—Robert Saifer
Attorney, Agent, or Firm—Phillips, Moorer, Weissenberger Lempio & Strabala

[57] ABSTRACT

A bar member is connected by means of a universal joint to a frame portion of a vehicle. The bar member is disposed through a restraining bracket fixed to the frame portion, and defines a step near its extended end. The bar member is free to pivot to a lower position determined by the restraining bracket under its own weight. The restraining bracket meanwhile allowing upward and lateral pivoting of the bar member if such bar member should encounter an obstacle as the vehicle is driven.

9 Claims, 4 Drawing Figures

PATENTED DEC 17 1974　　3,854,752
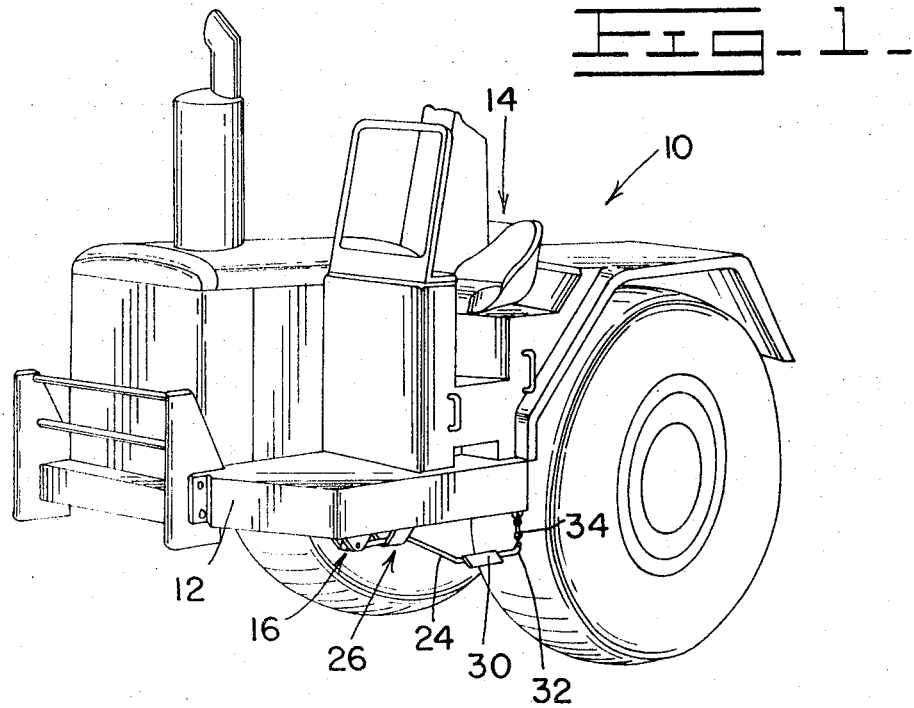
Fig-1-
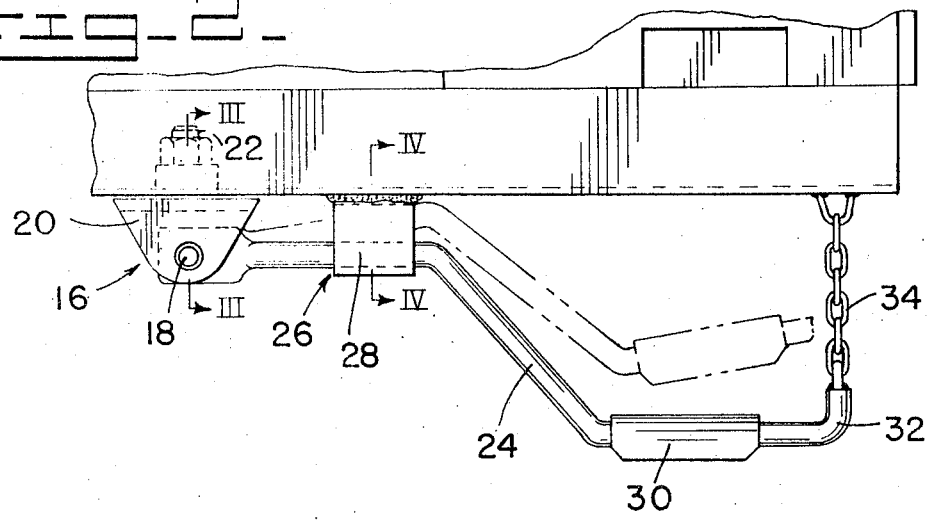
Fig-2-
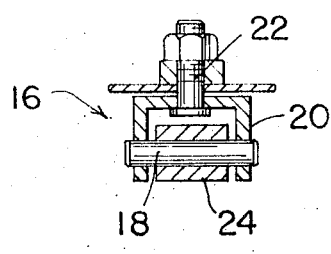
Fig-3-
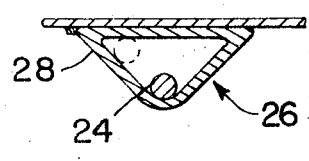
Fig-4-

VEHICLE STEP MOUNTING ARRANGEMENT

BACKGROUND OF THE INVENTION

This invention relates to step construction for use with a vehicle, and more particularly, to such step construction which allows pivoting thereof upon contact thereof with an obstruction.

In vehicles of the earth-moving type, it will be understood that the operator's platform thereof may be at such a height that a step or ladder member is needed to gain access thereof. Initially, it will of course be understood that such step should be sufficient to provide the support of one using it. In addition, the step, which by necessity may be located in an area susceptible to damage by the contact of obstructions therewith as the vehicle is driven, should be capable of withstanding such contact and remaining in a properly operable condition.

A possible solution to such a problem is to have the step structure foldable or recedable in accordance with, for example U.S. Pat. No. 2,487,660 to McCann. However, such step as disclosed in that patent includes the possible disadvantage that it automatically remains in a chosen position, requiring resetting thereof so as to be reusable as a step.

Of more general interest in this area are U.S. Pat. No. 3,467,219 to Frauenhoff (assigned to the assignee of this application) and U.S. Pat. No. 3,603,429 to Shepherd.

SUMMARY OF THE INVENTION

It is an object of this invention to provide vehicle step structure which is capable of pivoting to an extent upon contact thereof with a foreign object, so as to avoid damage to such step structure.

It is a further object of this invention to provide step structure which, while fulfilling the above object, automatically returns to a proper position for use after having been so struck or moved by said foreign object.

It is a still further object of this invention to provide step structure which, while fulfilling the above objects, is capable of proper and safe normal use.

It is a still further object of this invention to provide step structure which, while fulfilling the above objects, is simple in construction and design, and inexpensive to manufacture.

Broadly stated, the invention is in a vehicle having a frame portion which is susceptible to encountering obstacles. The invention comprises step means attached to the frame portion, comprising a bar member, and pivot means interconnecting one end of the bar member and the frame portion, and allowing the bar member to be pivoted upwardly and downwardly relative to the frame portion. Restraining bracket means are fixed relative to the frame portion and associated with the bar member for supporting the bar member in a lower position, the bar member adopting such lower position by pivoting downwardly relative to the frame portion under its own weight, meanwhile allowing pivoting of the bar member upwardly relative to the frame portion upon the bar member encountering an obstacle tending to pivot the bar member upwardly relative to the frame portion.

BRIEF DESCRIPTION OF THE DRAWINGS

These and other objects of the invention will become apparent from a study of the following specification and drawings, in which:

FIG. 1 is a perspective view of a vehicle which incorporates the invention;

FIG. 2 is a side elevation of the inventive step structure as applied to said vehicle;

FIG. 3 is a sectional view taken along the lines III—III of FIG. 2; and

FIG. 4 is a sectional view taken along the lines IV—IV of FIG. 2.

DESCRIPTION OF THE PREFERRED EMBODIMENT

Shown in FIG. 1 is a vehicle 10 having a platform frame portion 12 at such a height above ground level that the vehicle operator has need of a step or ladder member to gain access to an elevated operator station 14. It will be seen that as the vehicle 10 is operated, the frame portion 12 is susceptible to encountering obstacles such as large rocks or the like.

Fixed to the frame portion 12 are universal joint means 16 as shown in FIGS. 2 and 3. The universal joint means 16 include a pivot pin 18 tranversely oriented in a swivel bracket 20 that is in turn rotatably mounted to the underside of the frame portion 12 by means of a vertically oriented bolt 22. A bar member 24 has one end pivotally associated with pin 18. Thus, the universal joint means 16 interconnect the bar member 24 and frame portion 12, allowing the bar member 24 to be pivoted universally relative to the frame portion 12, i.e., upwardly and downwardly, and also laterally relative to the frame portion 12.

The bar member 24 extends rearwardly from the universal joint means 16 and is disposed through a restraining bracket 26. The restraining bracket 26 includes a bottom portion 28 of substantially V-shaped cross-section (FIG. 4), with the upper ends of the V fixed to the frame portion 12. The bar member 24 extends beyond the restraining bracket 26, downwardly therefrom, and defines an area 30 adapted for use as a step adjacent the extended end 32 of the bar member 24.

Under its own weight, the bar member 24 will adopt the lower position shown in full in FIG. 2, wherein it is supported in such lower position by the restraining bracket 26 and also by a chain which interconnects the frame portion 12 and the extended end 32 of the bar member 24. In such lower position, the bar member 24 is fully capable of being used as a step, through the support of the restraining bracket 26 and chain 34.

Should the bar member 24 contact an obstacle during the operation of the vehicle 10, the bar member 24 under the force of such contact may pivot upwardly and laterally to a limited extent determined by the restraining bracket 26 from such lower position, chain 34 not hindering such pivoting. Upon clearing of the obstacle, the bar member 24 pivots under its own weight downward to its normal, lower position, supported by restraining bracket 26 and chain 34, so that a proper step is provided for one who might use it.

The lower position of the bar member 24 is an extremely stable one, wherein it is situated between the sides of the V of the restraining bracket portion 28.

The limited pivotal motion described thus serves to prevent damage to the step arrangement.

It will be seen that the step 30 and chain 34 are in substantially side-by-side relation, with the step 30 being positioned inwardly from the chain-bar member connection in the direction of the universal joint means 16. It will thus be understood that, if one wishes to use the step portion 30, he is assured that the step portion 30 is properly positioned for his use by noting with his foot that the chain 34 is at the right of his foot. That is, if he wishes to use the step 30, and wants to be sure that his foot is in proper position relative thereto, he may swing his foot slightly to the right, and, if such foot contacts the chain 34, the user knows that his foot is in proper position so that downward movement thereof will bring it into contact with the step 30; if the user notes that the left side of his foot makes contact with the chain 34, he knows that the step portion 30 is then not directly below his foot, and he must move his foot so that contact between the right side thereof and the chain 34 is made.

Thus, the chain 34 also serves as a safety device, wherein the user may be assured that he is approaching step 30 in proper relative position thereto.

What is claimed is:

1. In a vehicle having a frame portion which is susceptible to encountering obstacles, step means attached to said framed portion comprising:
   a bar member;
   pivot means interconnecting one end of the bar member and the frame portion, and allowing the bar member to be pivoted upwardly and downwardly relative to the frame portion;
   restraining bracket means fixed relative to the frame portion and associated with the bar member for supporting the bar member in a lower position, the bar member adopting such lower position by pivoting downwardly relative to the frame portion under its own weight, meanwhile allowing pivoting of the bar member upwardly relative to the frame portion upon the bar member encountering an obstacle tending to pivot the bar member upwardly relative to the frame portion.

2. The apparatus of claim 1 wherein the pivot means comprise universal joint means for allowing the bar member to be pivoted universally relative to the frame portion, and wherein the restraining bracket means further comprise means for allowing the bar member to be pivoted laterally to a limited extent when the bar member is pivoted upwardly from its lower position relative to the frame portion upon the bar member encountering an obstacle tending to pivot the bar member upwardly and laterally relative to the frame portion.

3. The apparatus of claim 2 wherein the bar member extends from the pivot means beyond the restraining bracket means, and defines an area adapted for use as a step adjacent the extended end of the bar member.

4. The apparatus of claim 3 and further comprising additional support means interconnecting the extended end of the bar member and the frame portion for supporting the bar member in said lower position, meanwhile allowing said upward, downward and lateral pivoting of the bar member.

5. The apparatus of claim 4 wherein the additional support means comprise chain means interconnecting the extended end of the bar member and the frame portion.

6. The apparatus of claim 5 wherein the restraining bracket means comprise a substantially V-shaped member, the upper ends of which are fixed to the frame portion, and through which the bar member is disposed.

7. The apparatus of claim 2 wherein the restraining bracket means comprise a substantially V-shaped member, the upper ends of which are fixed to the frame portion, and through which the bar member is disposed.

8. The apparatus of claim 1 and further comprising additional support means interconnecting the extended end of the bar member and the frame portion for supporting the bar member in said lower position, meanwhile allowing said upward and downward pivoting of the bar member, such additional support means comprising chain means interconnecting the extended end of the bar member and the frame portion, and wherein the bar member extends from the pivot means beyond the restraining bracket means, and defines an area adapted for use as a step adjacent the extended end of the bar member.

9. The apparatus of claim 8 wherein the step and chain means are in substantially side-by-side relation, with the step positioned inwardly from the chain-bar member connection in the direction of the pivot means.

* * * * *